United States Patent [19]

Oliver

[11] 4,221,141

[45] Sep. 9, 1980

[54] METHOD AND APPARATUS FOR FEEDING BAR STOCK TO A MACHINE TOOL

[75] Inventor: Peter M. Oliver, Campbell, Calif.

[73] Assignee: Magnum Tooling Systems, Inc., South San Francisco, Calif.

[21] Appl. No.: 7,161

[22] Filed: Jan. 29, 1979

[51] Int. Cl.³ .................... B23B 13/00; B23B 27/00
[52] U.S. Cl. ................................. 82/2.5; 414/17
[58] Field of Search ............... 82/2.5; 414/14, 15, 414/16, 17

[56] References Cited

U.S. PATENT DOCUMENTS

| | | | |
|---|---|---|---|
| 2,327,916 | 8/1943 | Mariotte | 414/17 |
| 3,070,238 | 12/1962 | Holdridge | 414/17 |
| 3,266,348 | 8/1966 | Mancia | 82/2.5 |
| 3,691,879 | 8/1972 | Blake | 82/2.5 |
| 3,703,112 | 11/1972 | Selby | 82/2.5 |
| 4,034,632 | 7/1977 | Lohner | 82/2.5 |
| 4,048,879 | 9/1977 | Cox | 82/2.5 |
| 4,061,061 | 12/1977 | Lahm et al. | 82/2.5 |

FOREIGN PATENT DOCUMENTS 723066  7/1942  Fed. Rep. of Germany ............. 414/17

*Primary Examiner*—Harrison L. Hinson
*Attorney, Agent, or Firm*—Victor R. Beckman

[57] ABSTRACT

Stock feeding method and means are disclosed for feeding bar stock to an automatic machine tool and in particular a computer numeric controlled machine tool. A collet chuck attached to the hollow machine spindle includes jaws for gripping stock and jaw actuating means to operate the jaws between closed and open conditions. Stock is loaded into an elongated feed and actuating tube mounted for both axial, and rotational movement at the same rate as the machine spindle. The forward end of the feed tube is adapted for operation of the jaw actuating means upon axial movement. A chuck actuator is located to the rear of the machine spindle for rotatable support of the feed tube extending therethrough, and for axial movement of the tube for chuck operation. A stationary protective and support tube coaxially surrounds the rearwardly extending portion of the feed tube. The feed tube functions as a cylinder within which a short piston is mounted and is axially movable against the rear end of bar stock by fluid pressure supplied to the rear of the feed tube. After cut-off of an item from the bar stock, the cut-off tool, or other stop member, is positioned at the forward end of bar stock. The chuck jaws are opened to release the bar stock, and the stop member, under automatic machine control, is advanced. A programmed length of bar stock is fed through the chuck and the machine tool is programmed to reclose the chuck jaws to regrip the bar stock in preparation for machining another part.

15 Claims, 4 Drawing Figures

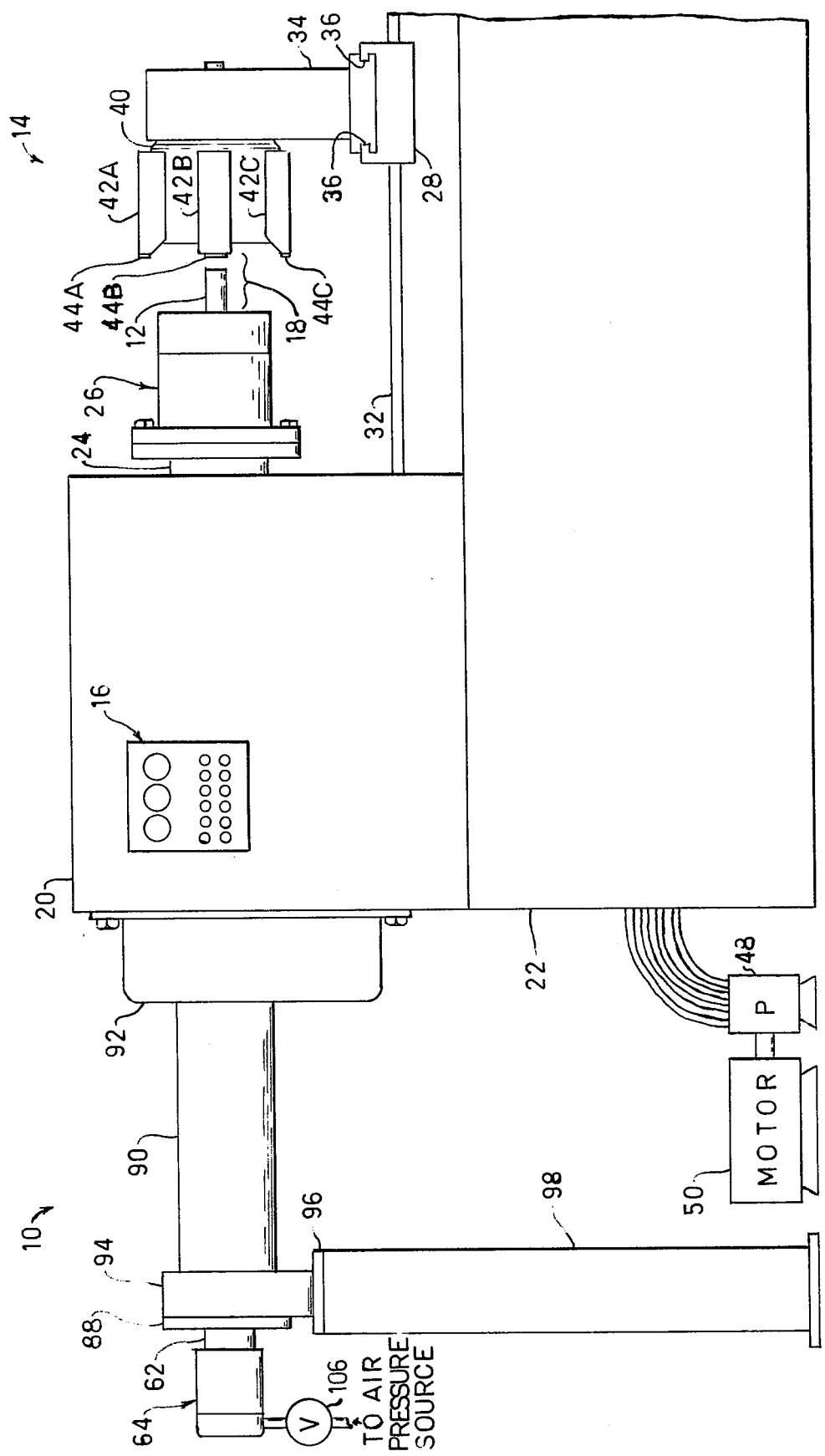

METHOD AND APPARATUS FOR FEEDING BAR STOCK TO A MACHINE TOOL

BACKGROUND OF THE INVENTION

Fluid operated pistons for advancing bar stock within a feed tube are known as shown in U.S. Pat. Nos. 4,034,632 and 3,945,506. Rotating bar stock feeder tubes through which bar stock is fed to a machine tool are known as shown in U.S. Pat. Nos. 3,823,628 and 4,061,061. U.S. Pat. No. 4,061,061 also shows the use of a rotary hydraulic cylinder for chuck operation through a pushout tube. In U.S. Pat. No. 4,048,879 a draw tube connects a chuck to a rotary cylinder actuator for chuck actuation. In addition, bar stock feeding mechanisms for feeding bar stock predetermined lengths are known as shown in U.S. Pat. Nos. 3,557,971; 3,812,983; 3,924,494; 4,019,411 and 4,088,230.

SUMMARY OF THE INVENTION AND OBJECTS

An object of this invention is the provision of improved method and means for automatically feeding bar stock to an automatic machine tool, and which feeding means is readily incorporated in new or existing machine tools.

An object of this invention is the provision of automatic bar stock feeding means of relatively simple, inexpensive, design and employing a minimum number of parts.

An object of this invention is the provision of an automatic bar stock feeding mechanism adapted for use with numeric control lathes of all types, but which is particularly well adapted for use with computer numeric control (CNC) machines for use in relatively short production runs.

An object of this invention is the provision of improved bar stock feeding method and means wherein vibration and noise generated by the rotating bar stock is greatly reduced relative to noise generated by the use of many prior art bar stock feeders.

An object of this invention is the provision of an automatic machine tool with automatic bar stock feeding means which is easily programmed and operates with high efficiency.

An object of this invention is the provision of simplified means for establishing the length of bar stock which is automatically supplied by a bar stock feeder included in a numerical control machine.

The above and other objects and advantages of the invention are achieved by use of a rotary feed and actuating tube within which bar stock to be fed to an NC or CNC machine tool is loaded. A short piston located within the feed tube abuts the rear end of bar stock loaded therein, and fluid under pressure supplied to the feed tube adjacent the rear end thereof urges the piston and bar stock in a forward direction. When the work holding device attached to the machine spindle releases the bar stock, the bar stock may be moved axially forward by the piston pushing thereon. The forward free end of the bar stock abuts a stop member programmed to move forward a predetermined distance to establish the length of bar stock fed during the feeding operation. If desired, the stop member simply may comprise the cutoff tool used to sever sections of material from the bar stock. When the stop member is moved axially forward a desired distance, the work holding device is actuated to regrip the bar stock in preparation for another machining operation. The rotary feed and actuator tube is reciprocally mounted for use in actuating the work holding device between open and closed conditions. A rotary hydraulic cylinder actuator supports the feed tube intermediate the opposite ends thereof, and functions to axially move the feed tube under program control for controlling opening and closing of the work holder.

BRIEF DESCRIPTION OF THE DRAWINGS

The invention, together with other objects and advantages thereof, will be better understood from the following description considered with the accompanying drawings. In the drawings, wherein like reference characters refer to the same parts in the several views:

FIG. 1 is a diagrammatic elevational view of a well-known prior art automatic lathe showing a bar stock feeder embodying the present invention incorporated therewith;

Figure 2A:
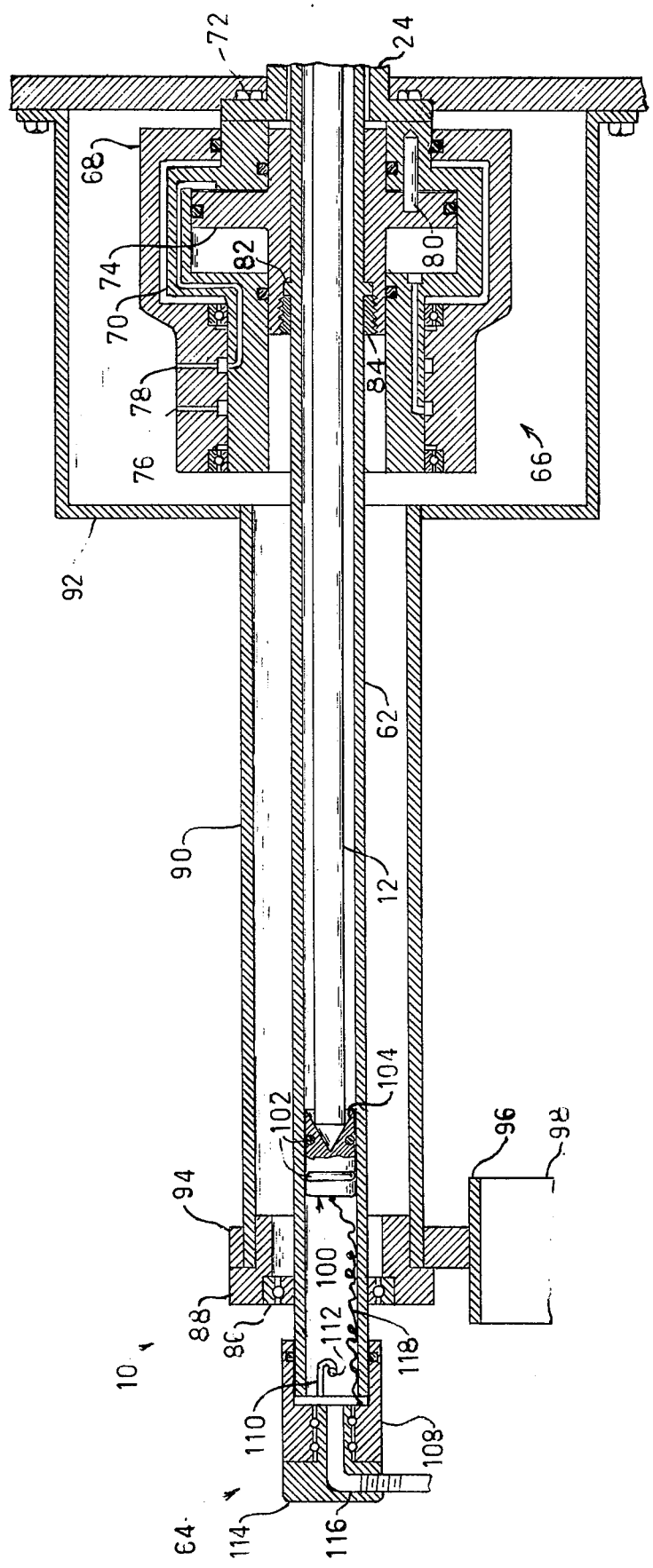
FIGS. 2A and 2B, together, comprise a fragmentary enlarged diagrammatic elevational view similar to that of FIG. 1 but with parts of the bar stock feeder shown in section.

Reference first is made to FIG. 1 wherein the novel bar stock feeder, identified generally by reference numeral 10, is shown for use in feeding bar stock 12 to an automatic machine tool 14 comprising, for example, an automatic lathe operating, say, under computer numeric control. A computer, or controller, which is programmed by use of a keyboard and/or tape reader at control panel 16 automatically controls bar stock machining and feed operations. Numeric control (NC) and computer numeric control (CNC) systems for control of automatic machine tools are well known and require no detailed description. However, the present invention does include a novel method of operating the automatic machine tool through a plurality of operations for feeding the bar stock a predetermined distance to a work or machining station 18 after machining of a part, which method is described below after completing the description of the apparatus.

The illustrated machine tool comprises a well known turret lathe with a headstock 20 on a base or bed 22. The head stock carries a machine spindle 24 having chuck means 26 at the forward end thereof for gripping the bar stock 12 and preventing axial movement thereof during machining operations. A carriage 28 is longitudinally movable under machine program control by Z-actuator 30 (see FIG. 2B) along tracks or ways 32 extending parallel to the longitudinal (Z) axis of the machine spindle 24. A cross-slide 34 is mounted on tracks or ways 36 extending perpendicular to the spindle axis for transverse movement of the cross-slide under machine program control by X-actuator 38. (see FIG. 2B). A turret 40 having a plurality of tool-holders 42A, 42B and 42C mounted thereon is rotatably supported on the cross-slide 34. Several tools, including those identified by reference characters 44A, 44B and 44C, supported by tool holder 42A, 42B and 42C, respectively, are visible in FIG. 1. Indexing means of conventional design, including turret actuator 46 (see FIG. 2B), rotates the turret 40 under program control to position the desired tool at the machining station 18. In the drawings, tool 44B is shown at the machining position. Where hydraulic-type actuators are employed, a hydraulic pump 48 operated by a motor 50 may provide a fluid pressure source for operation of the actuators.

Figure 2B:
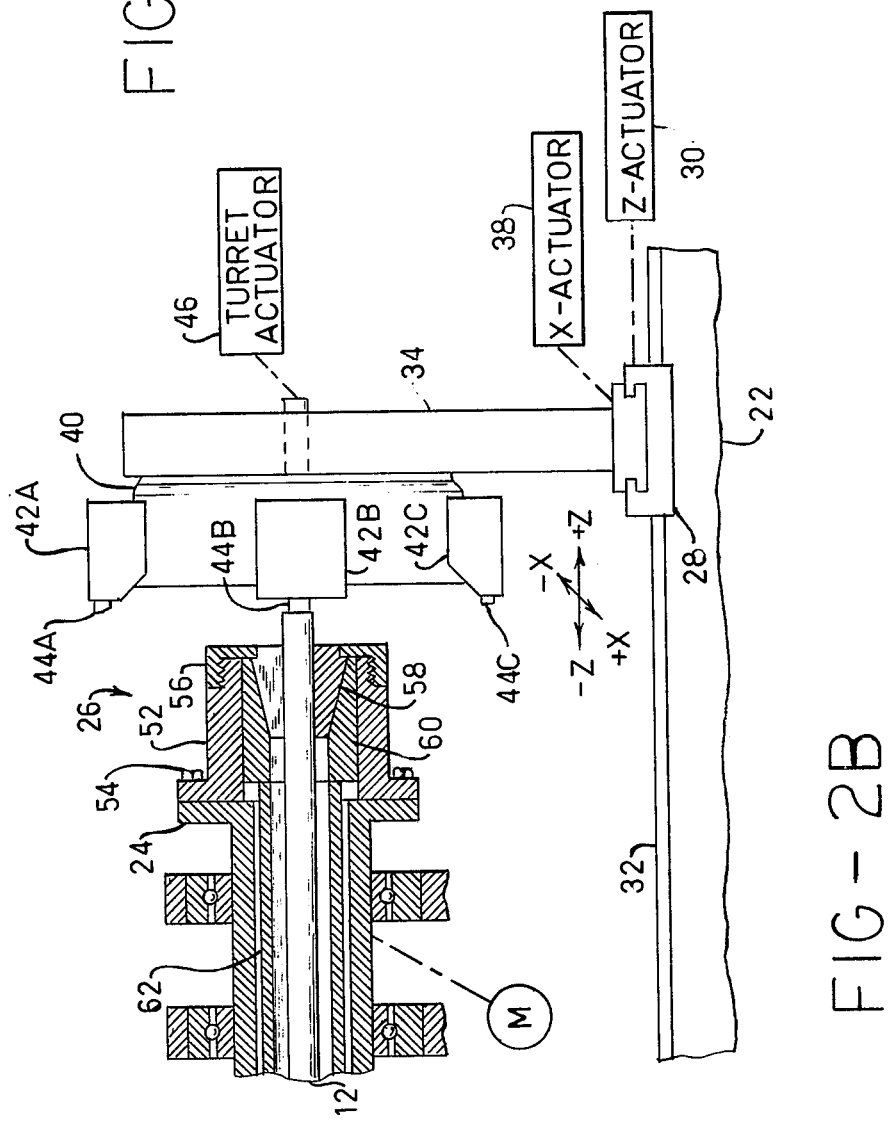

The chuck means 26 which may be of conventional design, is shown in FIG. 2B and comprises a housing 52 secured to a flange at the front of the machine spindle 24, as by bolts 54 for rotation therewith. A flanged nose piece 56 threadedly secured to the front of the housing 52 provides a forward stop for a work-gripping collet 58 mounted within the housing. An axially movable collet actuating sleeve 60 cooperates with the collet 58 for actuation thereof. In accordance with one aspect of the present invention, an integral bar stock feed and chuck actuating tube 62, which is mounted for both rotatable and axial movement, is used both for feeding bar stock 12 to the chuck and for axially displacing the collet actuating sleeve 60 for opening and closing the collet.

The combination feed and chuck actuating tube 62 extends form the collet actuating sleeve 60, at the front, to a swivel connector 64 at the rear thereof (FIG. 2A) for use in supplying fluid pressure to the rear thereof. The tube 62 is rotatably supported intermediate the opposite ends thereof by means of a hydraulic actuator 66, for axially moving the tube 62, is shown comprising a stationary housing 68 having a rotating cylinder 70 therein secured to the rear of the machine spindle by bolts 72 for rotation therewith. An axially movable piston 74 is located within the cylinder 70, which piston is axially movable forward and rearwardly under control of fluid pressure supplied to the opposite piston faces through actuator ports 76 and 78, respectively. A guide pin 80 between the cylinder 70 and piston 74 allows for relative axial movement while preventing relative rotary movement therebetween. The combination feed and actuating tube 62, which extends through the piston 74, is secured thereto by means of an external radial flange 82 on the tube, and a lock nut 84 in the piston, for axial and rotary motion of the tube with the piston. It will be seen that forward movement of the tube 62 by the piston 74 axially moves the chuck's actuating sleeve 60 forward to urge the collet 58 into gripping relationship with the bar stock 12, preventing relative axial movement of the bar stock within the collet. The bar stock is released from the collet when the tube 62 is moved axially rearwardly, thereby freeing the bar stock for forward axial movement under control of the bar stock feeder mechanism 10.

As seen in FIG. 2A, the rear of the combination feed and actuating tube 62 is rotatably supported in a bearing 86 carried in a rear bearing housing 88. It will be understood that the tube 62 is also axially slideable within the bearing 86. If desired, a bearing sleeve, not shown, may be provided on the tube 62 at the bearing 86 for sliding engagement with the inner surface of the inner bearing race. The bearing housing 88 is supported within the rear end of a cover tube 90 which surrounds the rearwardly-extending portion of the rotating feed and actuator tube 62 to protect the operator from such rotating part. The forward end of the cover tube is supported in an aperture formed in an actuator cover 92 secured to the headstock 20, and the rearward end thereof is supported in a leveling bracket 94. The leveling bracket includes an eccentrically located aperture through which the rear of the cover tube 90 extends. The bracket is rotatably positioned to level the cover tube 90, and feed and actuator tube 62 therein, and then secured to a plate 96 which, in turn, is attached to a stand 98 for the support thereof.

A piston 100 is axially slideably movable within the combination feed and actuator tube 62. Seal rings 102 carried by the piston provide a fluid tight engagement between the piston and inner tube wall to prevent fluid, under pressure, supplied to the rear of the tube from leaking past the piston. A conical-shaped hole 104 is formed at the front of the piston for centering the rear of the bar stock 12 extending into the hole.

Fluid, e.g. air, under pressure is supplied to the rear face of the piston to urge the same toward the chuck means for feeding bar stock therethrough whenever the bar stock is released from the grip of the chuck. The swivel connector 64, for connecting the rear end of the combination feed and actuator tube 62 to a fluid pressure source through a valve 106 (seen in FIG. 1) includes a housing 108 attached to the rear end of the tube 62 by a quick connect and release means which includes a J-shaped slot 110 formed in the end of the tube 62, and an inwardly directed pin 112 carried by the housing and adapted for sliding engagement within the slot to provide a bayonet-type connection therebetween. An end cap 114 is rotatably supported in the housing bore for relative rotation of the housing and cap. A port 116 through the cap provides communication between a fluid pressure source and the rear end of the combination feed and actuator tube 62. Fluid pressure is supplied to the tube through the connector during machining and bar feeding operations. Pressure is, of course, cut off during loading of barstock to the feeder.

Bar stock 12 is loaded into the tube 62 either from the front or from the rear end thereof. For loading from the front, the machine is programmed to move the cross-slide 34 and turret 40 mounted thereon transversely away from the machine spindle axis extended. The collet is released, and any length of feed stock remaining in the machine is removed. The bar stock is inserted into the combination feed and actuator tube through the chuck means 26, pushing the piston 100 rearwardly. Once loaded, the collet is closed and, the valve 106 is reopened in preparation for repeated cycles of operation for machining parts from the bar stock.

Loading of bar stock from the rear of the tube 62 also is possible by removal of the quick connect swivel connector 64 from the rear of the tube. For breech loading, the piston 100 must be removed from the tube before loading the bar stock. Normally, the piston will be located adjacent the chuck means 26 when a new piece of bar stock is to be loaded. The piston 100 must first be removed form the tube 62 before loading the tube with bar stock. It simply may be pushed rearwardly by extending a push rod through the chuck means. Alternatively, a flexible trailing line, or wire, 118 may be attached at one end to the rear of the piston. The other end of wire extends to the rear of the tube 62 and, if desired, may be attached to the swivel connector housing 108. Now, when the swivel connector 64 is removed from the tube 62, the piston 100 is readily removed from the tube by pulling on the trailing wire 118. The wire is of sufficient length to allow for travel of the free piston 100 to its forwardmost position in the tube adjacent the chuck. Alternatively, the fluid pressure at the rear of the tube 62 may be reduced below atmospheric pressure, as by connection of the connector 64 to a vacuum source instead of a pressure source, whereupon atmospheric pressure at the face of the piston urges the same rearwardly. A reduced pressure condition may be provided, for example, by connection of the existing fluid pressure source to a venturi for reduced pressure at the throat thereof, which, then, would be connected to the rear of the tube 62, through the connector. In any event, for breech feeding, the piston 100 is removed from the tube 62 and a piece of bar stock is inserted into the tube from the open rear end. Then, the piston 100 is replaced in the tube, the swivel connector 64 is reattached to the tube end, and pressure again is supplied thereto to move the piston against the rear of the bar stock, urging the same in a feeding direction.

A novel method of operating a machine tool equipped with the above-described bar stock feeder for sequentially feeding sections of a piece of bar stock loaded therein to the work station 18 now will be described. The method will best be understood from consideration of the following portion of a program which includes bar stock feeding instructions. In addition to instruction codes, instruction steps are numbered and comments are included to facilitate the following description and undestanding of the method.

| STEP | INSTRUCTION CODE | | | COMMENTS |
|---|---|---|---|---|
| 1 | M50 G50 | X-30000 | Z 10000 | Start Position |
| 2 | G00 | T0707 | S1000 M03 | Index Turret For Cut Off |
| 3 | | X-11000 | Z-15000 | Rapid To Cut Off Point |
| 4 | G01 | X 200 | F20 | Part Off |
| 5 | G00 | X 15000 | Z-14500 M05 | Rapid To Pick-up Point |
| 6 | | M 11 | | Open Collet |
| 7 | | Z-16000 | | Rapid In To Break Collet Seal |
| 8 | | Z 1350 | | Rapid To Material Stop Point |
| 9 | | M 10 | | Close Collet |
| 10 | | X-30000 | Z 10000 | Rapid To G50 Position |
| 11 | | T0700 | | Tool Off-Set Cancel |
| 12 | | M30 | | Return to Step 1. |

Figure 3:
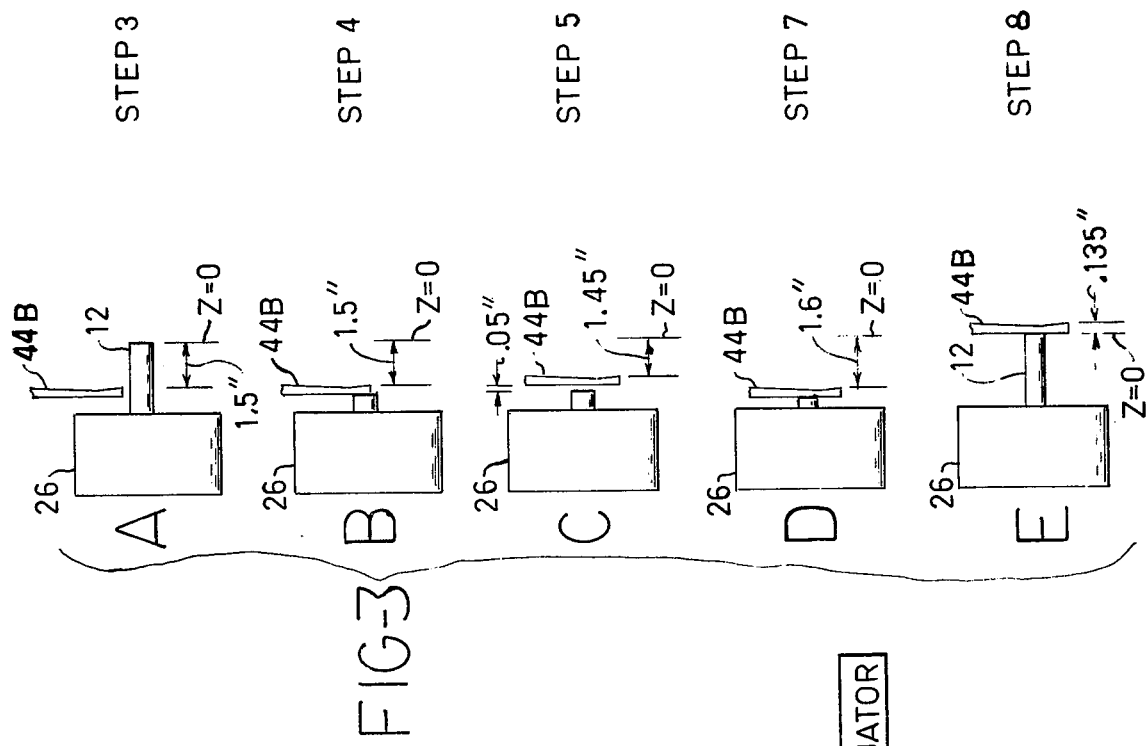
FIGS. 3A, B, C, D and E show, in diagrammatic form, relative positions of bar stock and a stop member following a series of machine operating instructions during bar stock feeding illustrating the novel feed method of the present invention.

It here will be noted that the above program was prepared for use with a Mori Sieki S.L.I. lathe, however it will be understood that the invention is not limited to use with any particular type of automatic machine tool. In FIG. 3, the position of tool 44B following certain program steps is shown to further illustrate the present bar feed method For purposes of illustration, Step 1 of the program defines a start position wherein the tools are remotely located from a section of bar stock of desired length at the machining station 18. Between steps 1 and 2, programming steps, not shown, are included for operating on the bar stock with tools carried by the turret for the desired machining thereof. Machine tool operations such as turning, facing, drilling, threading, cutting, etc., as required may be performed on the bar stock section. Following the desired machining operation, or operations, the turret 40 is indexed to position the parting, or cut-off, tool 44B at the work station, in accordance with step 2. At step 3, the cross-slide and carriage actuators are energized for rapid travel of the cut-off tool to the cut off point illustrated in FIG. 3A. By operation of step 4, the cut-off tool 44B is advanced in the +X direction to cut-off the machined section of bar stock, as shown in FIG. 3B. Now, by the next instruction, the cut-off tool is rapidly moved a short distance away from the end of the bar stock, in the +Z direction, and in the +X direction to position the cut off tool directly in front of the bar stock, as seen in FIG. 3C. The collet next is opened, (step 6 instruction) by connection of a hydraulic pressure source to port 78 (FIG. 2A) of the hydraulic actuator whereby the actuator piston 74 and attached feed and actuator tube 62 are moved rearwardly, thereby releasing the collet pressure sleeve 60 (FIG. 2B). Grip of the collet 58 on the bar stock 12 is broken by urging the bar stock rearwardly a short distance against the action of the piston 100, at step 7, and illustrated in FIG. 3D. Now, with the bar stock released from the grip of the collet, the machine is programmed for rapid movement of the tool 44B in the +Z direction (program step 8 FIG. 3E). As the tool 44B moves away from the chuck the bar stock follows by action of fluid pressure on the piston 100. When the carriage stops at the programmed stop point, at which point the desired length of bar stock extends from the chuck, the chuck is reclosed (step 9) and the tool is returned to the start position identified in step 1 (step 10). After a tool offset cancel instruction (step 11) the program is returned to step 1 (step 12) to repeat the programmed cycle. With the present invention there is no requirement to stop the machine spindle during bar feeding operations since the feed and actuator tube 62, piston 100, and bar stock 12 rotate together, as a unit, both during machining and bar stock feeding operations. Wear on the machine caused by frequent start-stop operations is reduced. Also, the present arrangement provides for very quiet operation which may contribute to a manufacturer's ability to meet noise level requirements of Governmental regulatory agencies such as the Occupational Safety and Health Agency. In addition, since a piston 100 of short length may be employed, substantially the entire length of tube 62 is available for bar stock. Also, since the piston 100 is free to travel the entire length of the tube 62, up to the chuck means 26, only a short length of bar stock remains after machining the final section of bar stock, thereby minimizing waste.

From the above description, it will be seen that the cut off tool functions as a movable stop member during bar stock feeding for use in setting the length of bar stock fed such cycle. Movement required to position the cut off tool to function as a movable stop is minimal since the tool is substantially in position following the part cut-off. Consequently, minimum time is required for the feeding operation. In addition, a separate stop member at one of the tool holders 42 is not required using the present invention. As a result, each of the holders may be provided with a machine tool for performing a maximum number of machining operations on the part. Also, the need for separate stop means is eliminated. It will be apparent that tools other than the cut off tool may be employed as the movable stop member, particularly when such tool is programmed to cut off a section of the bar stock. Obviously, a separate stop member carried at a tool holder 42 may be employed if desired, if there are a sufficient number of tool holders to accommodate such stop member and the necessary machine tools. With the present arrangement, when the piston 100 sequentially feeds stock to the point that the piston abuts the chuck 26, no further feeding is possible. After the last section of bar stock has been machined and cut off, the machine operation is stopped, the remaining bar stock is removed from the chuck, and a new piece of bar stock is loaded into the feeder, either from the front or rear of the feed tube, in the manner described above.

The invention having been described in detail in accordance with requirements of the Patent Statutes, various changes and modifications will suggest themselves to those skilled in the art. Obviously, the invention is not limited to the illustrated collet chuck 26. Other chuck means, such as three jaw chucks may be employed which are actuated between work clamping and released conditions by axial movement of the combined feed and actuator tube 62. The arrangement is not limited to any particular size, but may be dimensioned for operation with a wide range of sizes of bar stock. Also, non-cylindrical bar stock may be fed using the present invention. In addition, the system is adapted for installation on a variety of automatic machine tools, and on such tools having a variety of automatic control systems. It is intended that the above and other such changes and modifications shall fall within the spirit and scope of the invention defined in the claims.

I claim:

1. A bar feed arrangement for intermittently feeding a piece of bar stock through a rotatable spindle of a machine tool having chuck means at the front of the spindle for releasably holding the piece of bar stock with a leading portion thereof extending to a work station, said arrangement comprising an integral feed and chuck actuator tube extending through the spindle, which tube is rotatable with the spindle while being relatively axially movable therewith, chuck actuator means attached to the rear of the spindle for axially moving said tube for actuation of the chuck means between chuck open and chuck closed positions, said tube extending rearwardly of said spindle and being rotatably supported intermediate its opposite ends by said chuck actuator means, bearing means adjacent the rear end of said tube for support of the tube for rotatable and axial tube movement.

a piston axially movable within said tube under operation of fluid pressure supplied to the rear of the tube, and means for connecting said tube to a fluid pressure source for urging the piston against the rear end of the bar stock and feeding the bar stock along the tube and through said chuck means when the chuck means are actuated to chuck open position by axial movement of the tube by said chuck actuator means.

2. A bar feed arrangement as defined in claim 1 including a fixed protective cover surrounding at least a portion of said tube extending rearwardly of said chuck actuator means for support of said bearing means.

3. A bar feed arrangement as defined in claim 1 wherein said tube has a uniform bore therethrough within which said piston is movable the entire length of the tube.

4. A bar feed arrangement as defined in claim 1 wherein said means for connecting said tube to a fluid pressure source includes a swivel connector including a housing detachably secured to the rear of said tube for rotation therewith and an end cap rotatably supported by said housing.

5. A bar feed arrangement as defined in claim 4 including, a flexible trailing line connecting the rear of said piston to the swivel connector housing for use in removing the piston from the tube when the swivel connector is detached from the tube.

6. A bar feed arrangement as defined in claim 1 including, a flexible trailing line attached to the rear of said piston for use in removing the piston from the rear of the tube when breech loading bar stock into the tube.

7. The bar feed arrangement as defined in claim 1 for feeding a piece of bar stock to a programmable numerical control machine tool which operates through a plurality of cycles for machining successive sections of bar stock with tools at the work station, said arrangement including movable stop means abutting the leading end of the bar stock while said bar stock is being fed through said chuck means in the chuck open positon, and means under program control of the machine tool for stopping said movable stop member at a predetermined distance from the chuck means and then returning the chuck means to chuck closed position when a desired predetermined section of bar stock has been fed.

8. The bar feeder mechanism as defined in claim 7 wherein said movable stop member comprises cut off means for cutting successive sections of bar stock.

9. A computer numeric control machine operable through a plurality of cycles under programmed digital computer control to operate on successive sections of a piece of bar stock with tools at work station, said machine comprising, chuck means for holding the piece of bar stock with a leading end portion extending from the chuck means towards the work station and a trailing end portion extending in a direction away from the work station, movable stop means for abutting the leading end of the piece of bar stock, means for feeding sections of said piece of bar stock through said chuck means in the open position thereof to the work station while moving the abutting stop means forward through a predetermined stroke on each of the cycles of operation of the machine to sequentially feed predetermined length sections of the piece of bar stock to the work station, said feeding means comprising a rotatably mounted feed tube into which the trailing end portion of the piece of bar stock extends, a piston inside said feed tube abutting the trailing end of said piece of bar stock, and means for connecting the feed tube to a fluid pressure source for supplying fluid under pressure to said piston for continually urging said piece of bar stock toward said work station.

10. A machine as defined in claim 9 wherein said movable stop means comprises cut off tool means for cutting off successive sections of a piece of bar stock.

11. A method of operating a programmable computer numeric control machine tool for working on bar stock with tools located in a work area, said method comprising holding the bar stock in a chuck with a leading end portion of the bar stock extending into the work area and a trailing end portion of the bar stock extending from the chuck in a direction away from the work area, continually urging the bar stock in the direction of the work area, locating stop means adjacent the leading end of the bar stock in the work area after cutting off a section of a bar stock, opening the chuck to release the bar stock, moving the stop means away from the chuck to allow feeding of bar stock through the chuck, and reclosing the chuck to regrip the bar stock after moving the stop means a predetermined distance from the chuck, automatically controlling said chuck opening and closing operations and movement of said stop means by programmable digital computer means included in said computer numeric control machine tool.

12. A method as defined in claim 11 including employing a cut off tool as said stop means.

13. A bar feed arrangement as defined in claim 1 wherein said chuck actuator means is of the hydraulic type and includes, an actuator cylinder fixedly attached to the rear of the spindle, and an actuator piston fixedly secured to said tube and axially movable within said actuator cylinder.

14. A bar feed arrangement as defined in claim 13 including, means for constantly supplying hydraulic fluid under pressure to said hydraulic chuck actuator means for maintaining a rearward hydraulic force on said actuator piston and attached tube in the chuck open position and maintaining a forward hydraulic force on said actuator piston and attached tube in the chuck closed position.

15. A bar feed arrangement as defined in claim 14 including digital computer means for control of hydraulic fluid to said chuck actuator means for automatic control of chuck opening and closing operations.

* * * * *